No. 761,096. PATENTED MAY 31, 1904.
J. VON OVEN & J. C. BOESCH.
DECORTICATING MACHINE.
APPLICATION FILED APR. 28, 1903.
NO MODEL. 5 SHEETS—SHEET 4.

Witnesses
Inventors
Attorney

No. 761,096. PATENTED MAY 31, 1904.
J. VON OVEN & J. C. BOESCH.
DECORTICATING MACHINE.
APPLICATION FILED APR. 28, 1903.
NO MODEL. 5 SHEETS—SHEET 5.
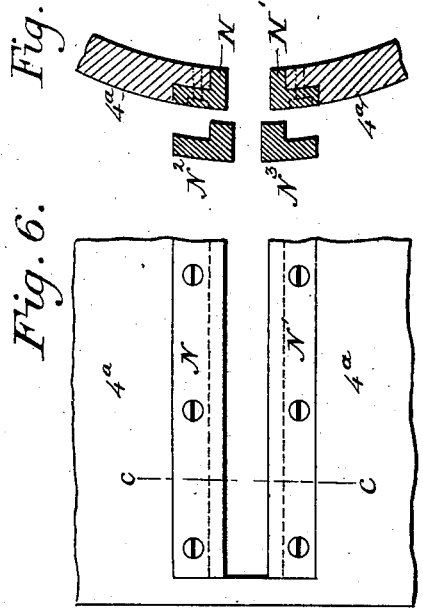
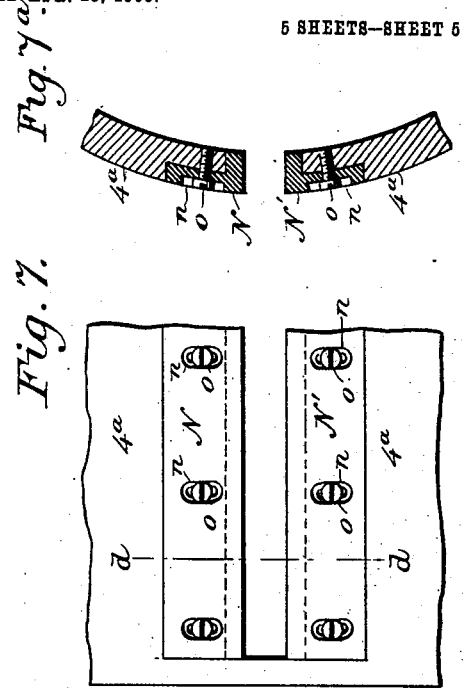
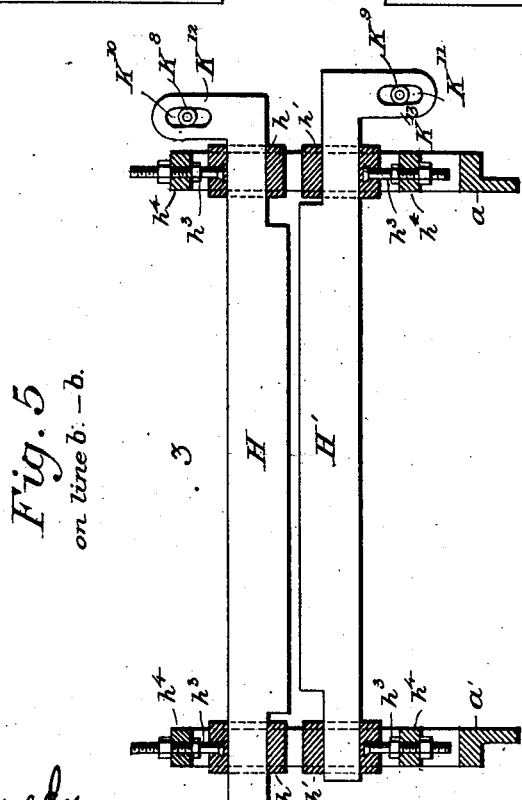

No. 761,096. Patented May 31, 1904.

UNITED STATES PATENT OFFICE.

JOHN VON OVEN AND JOHN C. BOESCH, OF CHARLESTON, SOUTH CAROLINA.

DECORTICATING-MACHINE.

SPECIFICATION forming part of Letters Patent No. 761,096, dated May 31, 1904.

Application filed April 28, 1903. Serial No. 154,655. (No model.)

*To all whom it may concern:*

Be it known that we, JOHN VON OVEN and JOHN C. BOESCH, of Charleston, county of Charleston, and State of South Carolina, have invented a new and useful Improvement in Decorticating-Machines, of which the following is a specification.

This invention relates to what are known in the art as "brakes" or "decorticators" for use in separating the bark and woody portions from the fiber of such plants as jute, ramie, hemp, &c.; and the invention consists in an improved apparatus for this purpose designed to effect the separation of the fiber in a simple, thorough, and expeditious manner and to deliver the same free from bark or pith or other adhering substances.

Figure 1:
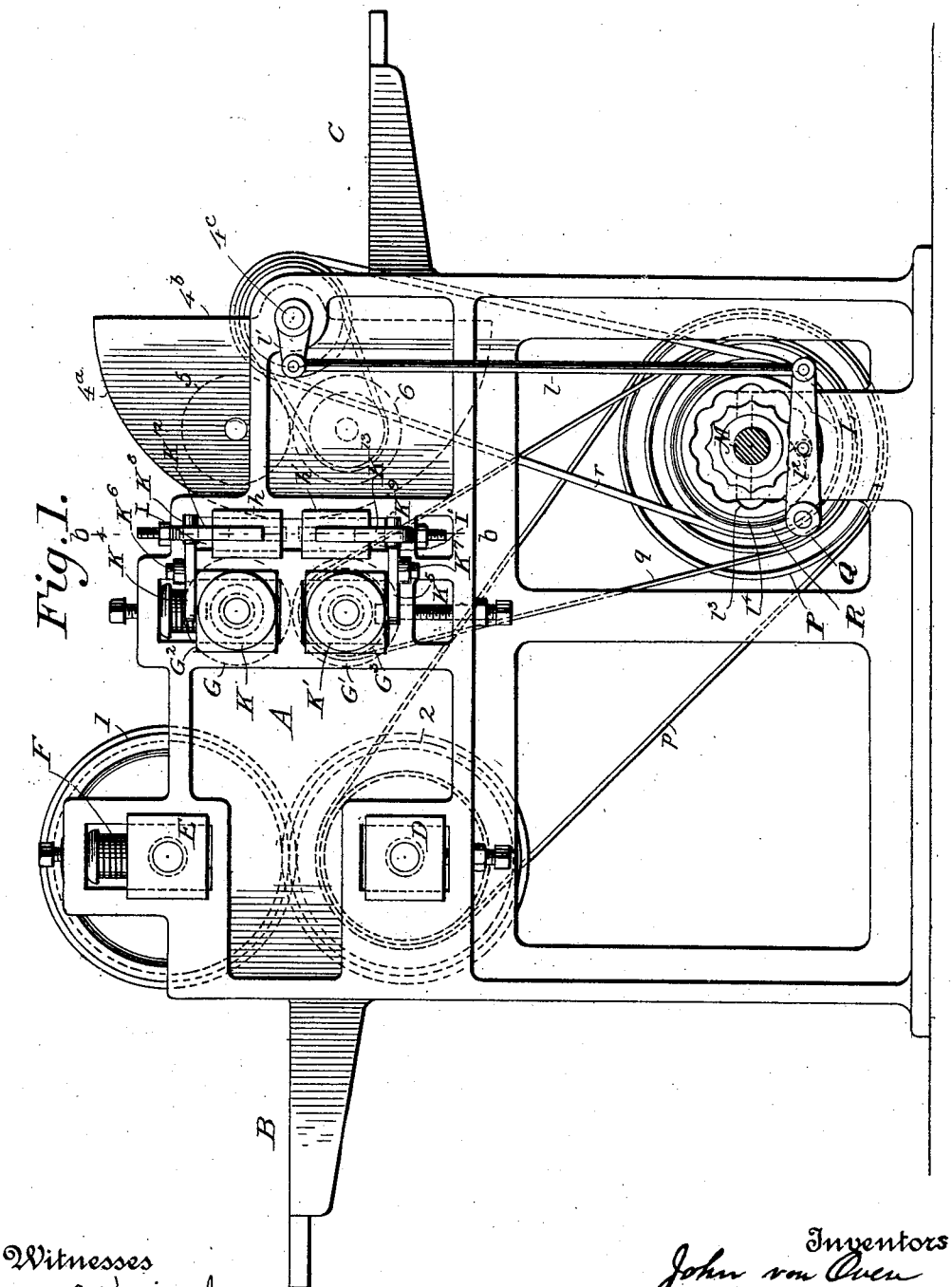
Figure 2:
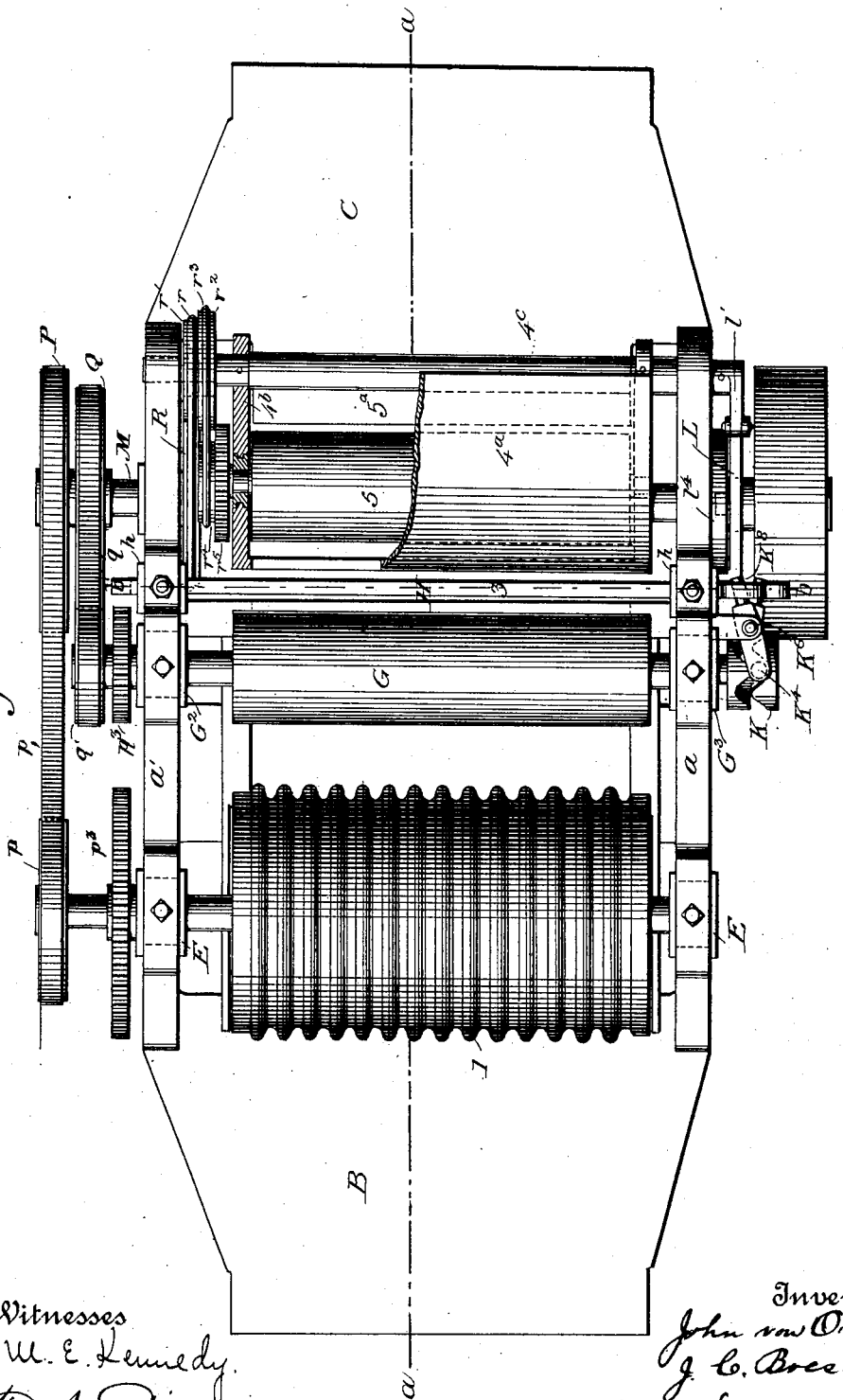
Figure 3:
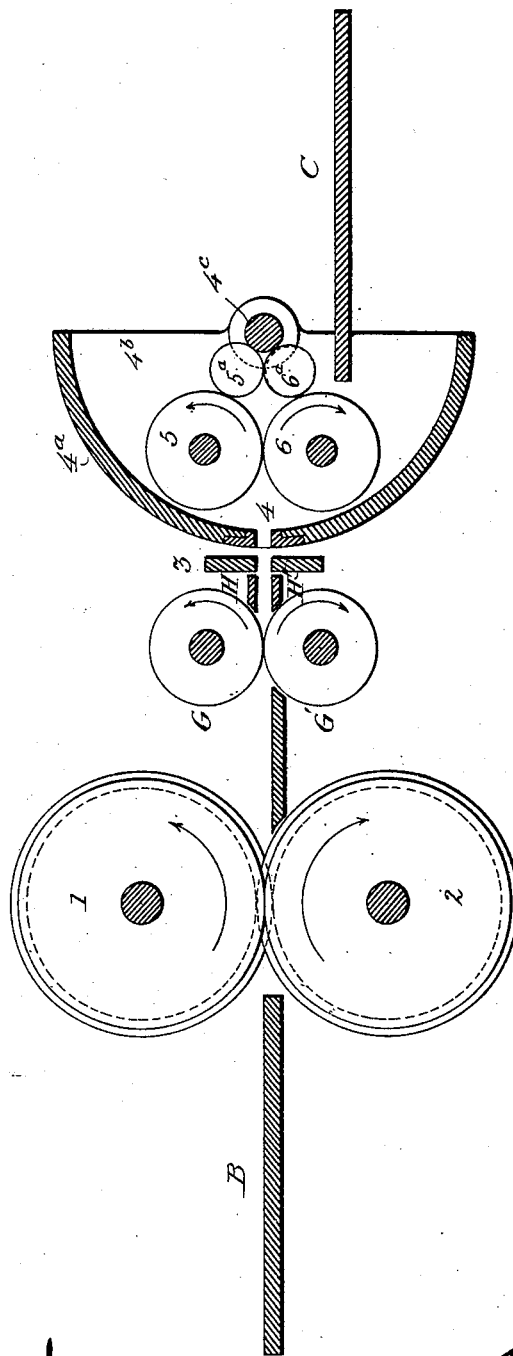
Figure 4:
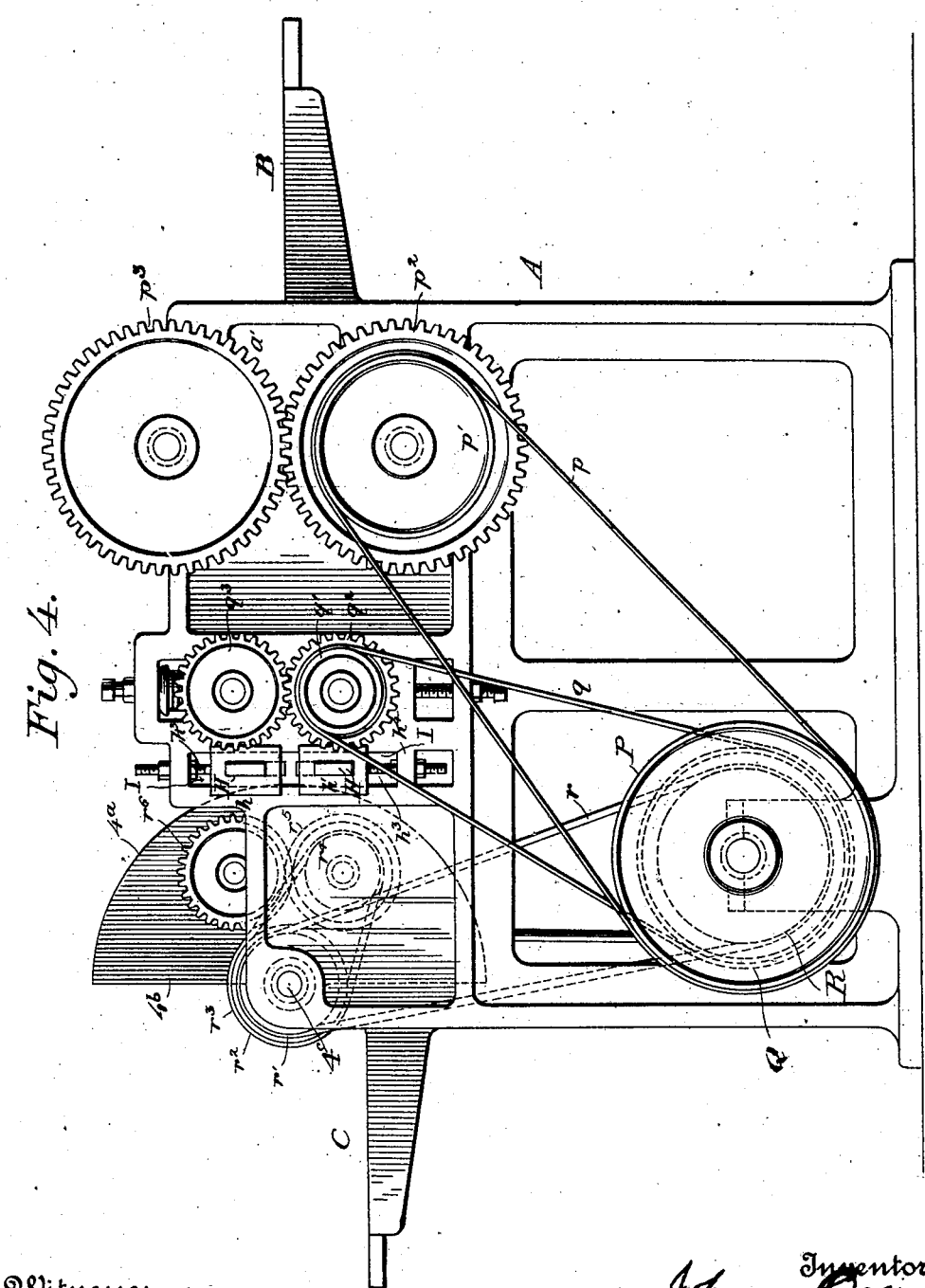

In the accompanying drawings, Figure 1 is a side elevation of the improved machine. Fig. 2 is a top plan view of the same. Fig. 3 is a longitudinal sectional elevation on the line $a\ a$ of Fig. 2. Fig. 4 is an elevation of the machine as viewed from the side opposite that shown in Fig. 1. Fig. 5 is a vertical sectional elevation on the line $b\ b$ of Figs. 1 and 2, showing the form and construction of the abutment. Fig. 6 is a face view of a portion of the brake, showing how the width of the slot therein may be varied. Fig. $6^a$ is a vertical section through the same on the line $c\ c$. Fig. 7 is a face view of the brake, showing a modified construction for varying the width of the slot. Fig. $7^a$ is a vertical section through the same on the line $d\ d$.

Referring to the drawings, referring first to Fig. 3, the machine embodies as its main elements upper and lower crushing feeding-rolls 1 and 2, between which the fiber-bearing stalk is fed and by which it is crushed and the exterior bark loosened from the woody pithy matter within; a brake 3, through which the crushed stalk is advanced and held against vertical motion; a reciprocating scutcher 4, having a slot for the passage of the fiber and operating with a combined drawing and bending action on the fiber as it issues from the brake and serving to break the woody pith and free the fiber of vegetable adhering matters, and upper and lower finishing-rolls 5 and 6, the function of which is to receive the fiber from the scutcher and subject the same to a final finishing treatment and deliver it from the machine. Referring to Figs. 1 and 2, these various operative elements are mounted in a suitable frame A, having at one end a horizontal feeding-table B and at its opposite end a horizontal delivery-table C, onto which the fiber in its finished condition is delivered by the finishing-rolls. The frame is formed with the two vertical uprights or standards $a\ a'$, between which the various rolls and operative mechanism are mounted and which standards are connected together and held in fixed relations by the feed and delivery tables.

The crushing-rolls 1 and 2 are arranged at the rear edge of table $a$, so as to receive between them the stalk supported on the table, the lower roll being mounted at its ends in vertically-adjustable bearings D, Fig. 1, while the upper roll is mounted in vertically-movable bearings E, subject to the action of compressing-springs F, the tendency of which is to hold the upper roll yieldingly against its lower companion roll. These rolls are preferably formed with circumferential ribs or corrugations and are rotated in opposite directions, as indicated by the arrows in Fig. 3, so as to advance the stalk fed between as they subject it to a crushing and disintegrating action. Between these crushing-rolls and the brake 3 is arranged a second pair of rolls G G', the main function of which is to receive the crushed stalk from the first rolls and feed and advance the same through the brake. These rolls are preferably smaller in diameter than the first pair and are mounted one above the other in bearings $G^2\ G^3$, similar in form and construction to the bearings of the first rolls. The brake 3 is situated immediately in rear of these small rolls, with its slot arranged opposite the pass between the rolls, so as to receive the stalk as it issues from the same, and the brake consists, as shown more particularly in Fig. 5, of an upper bar H and a lower bar H', arranged with a space between them for the passage of the fiber. These bars are mounted in the side standards of the frame, so as to have a relative longitudinal or endwise motion whereby the fiber passing between them is subjected to a transverse rubbing action, which assists in loosening the bark, and the bars are adjustable to and from each other to vary the width of the slot. To effect this adjustment of the bars and at the same time provide for their endwise reciprocation, they are mounted loosely at their ends, so as to slide endwise therein in movable blocks $h\ h'$, mounted in vertical guides I I', formed in the side standards of the frame. The blocks have connected with them so as to turn therein adjusting-bolts $h^3$, which are threaded in horizontal cross-plates $h^4$, extending between the guides respectively above and below the blocks, which bolts are provided with binding-nuts for holding them in the position adjusted. By turning the bolts the blocks carrying the bars may be moved to and from each other in the guides, thereby varying the width of the slot between the bars.

The endwise reciprocation of the bars H H' is effected by means of two cams K K', Figs. 1 and 2, on the ends of the rolls G G', which cams engage friction-rollers on the rear ends of the horizontal levers $K^4$ and $K^5$, mounted between their ends on vertical axes $K^6\ K^7$ on the side standard of the frame. The opposite ends of the levers are provided with friction-rollers $K^8\ K^9$, which engage in vertical slots $K^{10}\ K^{11}$, Fig. 5, in angular extensions $K^{12}\ K^{13}$ on the ends of the bars H H'. The cams K K' are disposed with relation to each other to reciprocate the bars in opposite directions alternately and with relation to each other as the rolls G G' are rotated.

The purpose of the slots $K^{10}\ K^{11}$ in the extensions of the bars is to admit of the adjustment of the bars to and from each other while subject to the action of the levers $K^4\ K^5$.

It is not essential that both of the bars be reciprocated as described, for good results may be secured if only one bar is reciprocated and the other remains fixed; nor is it essential that both bars be adjustable, for the same result may be secured if but one is movable to and from the other. The essence of the invention as regards the form and arrangement of these bars is that one may be reciprocated with respect to the other and that the distance between the bars may be varied to vary the width of the slot through which the fiber passes.

The oscillating scutcher 4, before alluded to, is in the form of a semidrum situated immediately in rear of the brake just described, so that the fiber as it passes through the slot in the brake will enter that in the drum. This drum is formed with a semicircular casing $4^a$, having connected to its ends semicircular end walls $4^b$, and it is mounted fixedly on a horizontal shaft $4^c$, which shaft is mounted in bearings in the side standards in the frame. The slot through which the fiber passes is formed in the face of the semicircular casing $4^a$, as clearly shown in Fig. 3, and the drum is given a rapid oscillatory motion around its shaft, and its action is to bend the fiber projecting through and held against vertical motion in the brake to and fro, while at the same time, owing to the movement of the drum on an axis, it will operate on the fiber and bark with a pulling or drawing effect, which combined actions will effectually and thoroughly dislodge the woody matters and bark, which substances are discharged downward between the drum and the brake, as indicated in Fig. 3. These combined actions of the drum or scutcher on the fiber are deemed of great advantage and importance, and while we have shown a specific means which is thought best adapted for the end in view we do not limit ourselves to the same, and our invention in this connection is intended to embrace, broadly, means for rapidly bending the fiber-stalk back and forth and simultaneously subjecting it to a pulling or drawing action. The semidrum is given its reciprocating motion by means of a horizontal lever L, Fig. 1, pivoted at one end to the frame near its base and jointed at its opposite end, by means of a vertical link $l$, to the end of an elbow-lever $l'$ on the end of the shaft $4^c$. Between its ends the lever L is provided with a friction-roller $l^2$, engaging in a cam $l^3$ in the face of a disk $l^4$ on the end of a main driving-shaft M, mounted in bearings in the base of the frame, which driving-shaft is provided with a pulley $m$, adapted to be driven from a suitable source of power. By the rotation of the shaft the lever L is rapidly vibrated in a vertical direction, and through its connection with the arm on the drum-shaft the latter is given a rapid rocking motion and will impart to the drum an oscillating motion on its axis as a center.

The finishing-rolls 5 and 6, before alluded to, are mounted one above the other in bearings in the end walls of the semidrum, so that while they may be rotated around their axes, as described, they are also subjected to the oscillating motion of the drum. In other words, these rollers are oscillated bodily with the drum and during the oscillating motion are rotated on their axes in opposite directions, and receiving the fiber between them as it issues through the slot in the drum they subject it to a final finishing or brushing action and deliver it onto the delivery-table C. These rolls may have their surfaces variously formed, according to the nature of the material under treatment and the quality of the fiber desired. For very fine work they may be furnished with brushes. The additional rolls $5^a$ and $6^a$ may be employed or not, as desired. The surfaces may also be smooth or corrugated or roughened in other ways, the essential idea being that as the fiber leaves the scutcher it will be taken up by the rolls and subjected to a finishing treatment and delivered to the table in finished condition. By reason of the bodily movement of the rolls and their axes with the drum the tension of the fiber between the scutcher and the rolls is uniform and not subjected to unequal strains, which would result if the axes of the rolls were fixed and the drum movable with relation to them.

As shown in Figs. 6, 6$^a$, 7, and 7$^a$, provision is made for varying or adjusting the width of the slot in the drum. As shown in Figs. 6 and 6$^a$, the slot is lined or faced with removable plates N N', angular in cross-section, with one face extending radially of the drum and constituting the walls of the slot and the other face extending in the line of the periphery of the drum. By providing plates N$^2$ N$^3$ interchangeable with the plates N N' and with the radial portions of greater thickness the width of the slot may be reduced, or other plates with the radial portions less in thickness may be applied to widen the slot. The same result may be accomplished, as shown in Figs. 7 and 7$^a$, by providing for the adjustment of the plates N N' to and from each other by forming in the plates slots $n$, through which slots adjusting-screws $o$ are passed and into the drum.

The proper relative motions are given to the operative parts of the mechanism, as shown in Figs. 1, 2, and 4. Referring to these figures, it will be seen that the main driving-shaft M before alluded to has fixed to it beyond the frame an outer pulley P and an inner pulley Q. The pulley P is connected by a belt $p$ with a pulley $p'$ on the journal of the lower crushing-roll 2, and motion is imparted from this roll to the upper companion roll by means of a pinion $p^2$ on the lower roll, which meshes with a pinion $p^3$ on the upper roll. (See Fig. 4.) The second set of feed-rolls G G' are driven from the pulley Q on the main shaft, which is connected by a belt $q$ with a pulley $q'$ on the lower roll G', which roll is provided with a pinion $q^2$, meshing with a pinion $q^3$ on the companion roll. The finishing-rolls are driven from a third pulley R on the main shaft at the inner side of the frame-standard. This pulley is connected by a belt $r$ with a pulley $r'$, loose on the drum-shaft 4$^c$. This loose pulley has connected with it a pulley $r^2$, which is connected by a belt $r^3$ with a pulley $r^4$ on the lower finishing-roll, and the motion of this roll is imparted to the companion roll by the intermeshing gears $r^5$ and $r^6$, fixed, respectively, to said rolls.

The operation of the mechanism is as follows: Motion being imparted to the various mechanisms and the rolls being driven in the directions indicated by the arrows, Fig. 3, the stalk to be treated is fed from table B to the crushing-rolls 1 and 2, and by them it is crushed and partially disintegrated and the exterior bark loosened from the woody or pithy matter within. The crushed stalk is taken up by the second pair of feeding-rolls G G' and by them further crushed and disintegrated and advanced through the opening in the brake 3, by which it is subjected to a rubbing action which assists in loosening the adhering pith and bark and by which the stalk is held against vertical movement. From this brake the stalk passes into the slot in the scutcher 4 and is bent rapidly to and fro across the edge of the brake and at the same time subjected to a drawing action, which treatment serves to thoroughly break and loosen the woody pith and bark and discharge the same downward from the machine. The fiber thus freed from its adhering vegetable substances is received between the finishing-rolls 5 and 6 and by them subjected to a final finishing treatment and delivered in marketable condition onto the delivery-table.

Having thus described our invention, what we claim is—

1. In a decorticating-machine the combination with means for crushing the stalk, of means for feeding the same longitudinally, and means for subjecting the stalk to a transverse rubbing action, alternately in opposite directions on opposite sides.

2. In a decorticating-machine the combination with a brake fixed against vertical movement and fixed also against movement in the direction of travel of the stalks and provided with an opening, of means for advancing the stalks through said opening, means for subjecting the stalks in their passage therethrough to a transverse rubbing action, and means for bending the stalk to and fro as it issues from the abutment.

3. In a decorticating-machine and in combination with means for feeding the stalk, a brake provided with a slot for the passage of the stalk, and means for reciprocating one wall of the slot with relation to the other wall.

4. In a decorticating-machine and in combination with means for feeding the stalk, a brake consisting of two bars arranged side by side with a space between them for the passage of the stalk, and means for reciprocating one bar endwise with respect to the other bar.

5. In a decorticating-machine the combination with means for feeding the stalk, of a brake consisting of two bars arranged with a space between them for the passage of the stalk, and means for reciprocating said bars endwise alternately in opposite directions.

6. In a decorticating-machine and in combination with means for feeding the stalk, a brake comprising two bars arranged with a space between them for the passage of the stalk, means for adjusting one of the bars to and from the other bar, and means for reciprocating one of the bars endwise with respect to the other bar.

7. In a decorticating-machine the combination with a brake, of a reciprocating scutcher adjacent thereto, and finishing-rolls movable bodily with the scutcher and in position to act on the fiber after it is acted on by the scutcher.

8. In a decorticating-machine the combination with a brake, of a scutcher in the form of a semidrum provided with a curved surface and end walls, and having a slot in said curved surface for the passage of the stalk, a horizontal shaft on which the drum is axially mounted, means for oscillating said drum on an axis coincident with that of the shaft, finishing-rolls mounted in bearings in the end walls of the drum, and means for rotating said rolls around their longitudinal axes.

9. In a decorticating-machine the combination of crushed rolls between which the stalk is fed and by which it is crushed and partially disintegrated, a brake held against vertical movement and formed with a horizontal slot, means for advancing the crushed stalk through the slot, means for moving one wall of said slot endwise with relation to the other, a reciprocating scutcher movable in a curved path adjacent to the brake and provided with a slot, and horizontal rotary finishing-rolls movable bodily with said brake.

In testimony whereof we hereunto set our hands, this 14th day of April, 1903, in the presence of two attesting witnesses.

JOHN VON OVEN.
JOHN C. BOESCH.

Witnesses:
H. D. SCHRIVEERS,
JOHN F. MEYER, Jr.